(12) United States Patent
Arunasalam et al.

(10) Patent No.: US 9,772,235 B2
(45) Date of Patent: Sep. 26, 2017

(54) METHOD OF SENSING SUPERHEAT (71) Applicant: Zhejiang DunAn Hetian Metal Co., Ltd, Zhuji, Zhejiang (CN)

(72) Inventors: Parthiban Arunasalam, Austin, TX (US); Wayne C. Long, Austin, TX (US)

(73) Assignee: Zhejiang DunAn Hetian Metal Co., Ltd., Zhuji (CN)

( * ) Notice: Subject to any disclaimer, the term of this patent is extended or adjusted under 35 U.S.C. 154(b) by 452 days.

(21) Appl. No.: 14/585,785

(22) Filed: Dec. 30, 2014

(65) Prior Publication Data

US 2015/0110148 A1    Apr. 23, 2015

Related U.S. Application Data

(62) Division of application No. 13/563,017, filed on Jul. 31, 2012, now Pat. No. 9,140,613.

(60) Provisional application No. 61/611,747, filed on Mar. 16, 2012.

(51) Int. Cl.
    *G01K 13/02*    (2006.01)
    *G01K 15/00*    (2006.01)

(52) U.S. Cl.
    CPC ........... *G01K 13/02* (2013.01); *G01K 15/005* (2013.01)

(58) Field of Classification Search
    CPC .......................... G01K 13/02; G01K 15/005
    See application file for complete search history.

(56) References Cited

U.S. PATENT DOCUMENTS

| 668,202 | A | 2/1901 | Nethery |
| 886,045 | A | 4/1908 | Ehrlich et al. |
| 1,886,205 | A | 11/1932 | Lyford |
| 1,926,031 | A | 9/1933 | Boynton |
| 2,412,205 | A | 12/1946 | Cook |
| 2,504,055 | A | 4/1950 | Thomas |
| 2,651,325 | A | 9/1953 | Lusignan |
| 2,840,107 | A | 6/1958 | Campbell |

(Continued)

FOREIGN PATENT DOCUMENTS

| CN | 1673703 A | 9/2005 |
| CN | 2859486 Y | 1/2007 |

(Continued)

OTHER PUBLICATIONS

Chinese First Office Action, Application No. CN 201310081837.9, dated Aug. 18, 2016.

(Continued)

*Primary Examiner* — Lisa Caputo
*Assistant Examiner* — Philip Cotey
(74) *Attorney, Agent, or Firm* — MacMillan, Sobanski & Todd, LLC (57) ABSTRACT

A method of sensing superheat includes the steps of: (a) connecting a fluid inlet member of a superheat sensor to one of a plurality of fluid systems; (b) allowing fluid to flow from the fluid system to which the superheat sensor is connected to the superheat sensor; (c) sensing a temperature of the fluid in the fluid system with one of an internal temperature sensor mounted within a housing of the superheat sensor and an external temperature sensor mounted outside of the housing of the superheat sensor; and (d) calculating a superheat of the fluid in the fluid system.

10 Claims, 5 Drawing Sheets

(56) References Cited

U.S. PATENT DOCUMENTS

| | | |
|---|---|---|
| 2,875,779 A | 3/1959 | Campbell |
| 3,031,747 A | 5/1962 | Green |
| 3,540,218 A | 11/1970 | Finn |
| 3,597,977 A * | 8/1971 | Zierak .................... G01K 5/326 337/307 |
| 3,729,807 A | 5/1973 | Fujiwara |
| 3,747,628 A | 7/1973 | Holster et al. |
| 3,808,469 A * | 4/1974 | Raymond ............. G01L 1/2281 219/504 |
| 3,860,949 A | 1/1975 | Stoeckert et al. |
| 4,005,454 A | 1/1977 | Froloff et al. |
| 4,019,388 A | 4/1977 | Hall, II et al. |
| 4,023,725 A | 5/1977 | Ivett et al. |
| 4,100,236 A | 7/1978 | Gordon et al. |
| 4,152,540 A | 5/1979 | Duncan et al. |
| 4,181,249 A | 1/1980 | Peterson et al. |
| 4,298,023 A | 11/1981 | McGinnis |
| 4,341,816 A | 7/1982 | Lauterbach et al. |
| 4,354,527 A | 10/1982 | McMillan |
| 4,434,813 A | 3/1984 | Mon |
| 4,476,893 A | 10/1984 | Schwelm |
| 4,543,875 A | 10/1985 | Imhof |
| 4,545,212 A | 10/1985 | Noda |
| 4,581,624 A | 4/1986 | O'Connor |
| 4,593,719 A | 6/1986 | Leonard et al. |
| 4,628,576 A | 12/1986 | Giachino et al. |
| 4,647,013 A | 3/1987 | Giachino et al. |
| 4,660,387 A | 4/1987 | Usami |
| 4,661,835 A | 4/1987 | Gademann et al. |
| 4,687,419 A | 8/1987 | Suzuki et al. |
| 4,768,348 A | 9/1988 | Noguchi |
| 4,772,935 A | 9/1988 | Lawler et al. |
| 4,821,997 A | 4/1989 | Zdeblick |
| 4,824,073 A | 4/1989 | Zdeblick |
| 4,826,131 A | 5/1989 | Mikkor |
| 4,828,184 A | 5/1989 | Gardner et al. |
| 4,835,976 A * | 6/1989 | Torrence ............... F25B 41/062 62/115 |
| 4,869,282 A | 9/1989 | Sittler et al. |
| 4,932,788 A | 6/1990 | Yeh |
| 4,938,742 A | 7/1990 | Smits |
| 4,943,032 A | 7/1990 | Zdeblick |
| 4,946,350 A | 8/1990 | Suzuki et al. |
| 4,959,581 A | 9/1990 | Dantlgraber |
| 4,966,646 A | 10/1990 | Zdeblick |
| 5,000,009 A | 3/1991 | Clanin |
| 5,029,805 A | 7/1991 | Albarda et al. |
| 5,037,778 A | 8/1991 | Stark et al. |
| 5,050,838 A | 9/1991 | Beatty et al. |
| 5,054,522 A | 10/1991 | Kowanz et al. |
| 5,058,856 A | 10/1991 | Gordon et al. |
| 5,061,914 A | 10/1991 | Busch et al. |
| 5,064,165 A | 11/1991 | Jerman |
| 5,065,978 A | 11/1991 | Albarda et al. |
| 5,066,533 A | 11/1991 | America et al. |
| 5,069,419 A | 12/1991 | Jerman |
| 5,070,706 A | 12/1991 | Waters et al. |
| 5,074,629 A | 12/1991 | Zdeblick |
| 5,082,242 A | 1/1992 | Bonne et al. |
| 5,096,643 A | 3/1992 | Kowanz et al. |
| 5,116,457 A | 5/1992 | Jerman |
| 5,131,729 A | 7/1992 | Wetzel |
| 5,133,379 A | 7/1992 | Jacobsen et al. |
| 5,142,781 A | 9/1992 | Mettner et al. |
| 5,161,774 A | 11/1992 | Engelsdorf et al. |
| 5,169,472 A | 12/1992 | Goebel |
| 5,176,358 A | 1/1993 | Bonne et al. |
| 5,177,579 A | 1/1993 | Jerman |
| 5,178,190 A | 1/1993 | Mettner |
| 5,179,499 A | 1/1993 | MacDonald et al. |
| 5,180,623 A | 1/1993 | Ohnstein |
| 5,197,517 A | 3/1993 | Perera |
| 5,209,118 A | 5/1993 | Jerman |
| 5,215,244 A | 6/1993 | Buchholz et al. |
| 5,216,273 A | 6/1993 | Doering et al. |
| 5,217,283 A | 6/1993 | Watanabe |
| 5,222,521 A | 6/1993 | Kihlberg |
| 5,238,223 A | 8/1993 | Mettner et al. |
| 5,244,537 A | 9/1993 | Ohnstein |
| 5,267,589 A | 12/1993 | Watanabe |
| 5,271,431 A | 12/1993 | Mettner et al. |
| 5,271,597 A | 12/1993 | Jerman |
| 5,285,648 A | 2/1994 | Bessler |
| 5,295,360 A | 3/1994 | Olds et al. |
| 5,309,943 A | 5/1994 | Stevenson et al. |
| 5,323,999 A | 6/1994 | Bonne et al. |
| 5,325,880 A | 7/1994 | Johnson et al. |
| 5,333,831 A | 8/1994 | Barth et al. |
| 5,336,062 A | 8/1994 | Richter |
| 5,355,712 A | 10/1994 | Petersen et al. |
| 5,368,704 A | 11/1994 | Madou et al. |
| 5,375,919 A | 12/1994 | Furuhashi |
| 5,400,824 A | 3/1995 | Gschwendtner et al. |
| 5,415,024 A | 5/1995 | Proffitt et al. |
| 5,417,235 A | 5/1995 | Wise et al. |
| 5,445,185 A | 8/1995 | Watanabe et al. |
| 5,458,405 A | 10/1995 | Watanabe |
| 5,543,349 A | 8/1996 | Kurtz et al. |
| 5,553,790 A | 9/1996 | Findler et al. |
| 5,566,703 A | 10/1996 | Watanabe et al. |
| 5,577,533 A | 11/1996 | Cook, Jr. |
| 5,589,422 A | 12/1996 | Bhat |
| 5,611,214 A | 3/1997 | Wegeng et al. |
| 5,663,899 A | 9/1997 | Zvonar et al. |
| 5,666,815 A | 9/1997 | Aloise |
| 5,785,295 A | 7/1998 | Tsai |
| 5,810,325 A | 9/1998 | Carr |
| 5,820,262 A | 10/1998 | Lechner |
| 5,838,351 A | 11/1998 | Weber |
| 5,848,605 A | 12/1998 | Bailey et al. |
| 5,856,705 A | 1/1999 | Ting |
| 5,873,385 A | 2/1999 | Bloom et al. |
| 5,908,098 A | 6/1999 | Gorman et al. |
| 5,909,078 A | 6/1999 | Wood et al. |
| 5,926,955 A | 7/1999 | Kober |
| 5,941,084 A | 8/1999 | Sumida et al. |
| 5,941,608 A | 8/1999 | Campau et al. |
| 5,954,079 A | 9/1999 | Barth et al. |
| 5,955,817 A | 9/1999 | Dhuler et al. |
| 5,970,998 A | 10/1999 | Talbot et al. |
| 5,994,816 A | 11/1999 | Dhuler et al. |
| 6,019,437 A | 2/2000 | Barron et al. |
| 6,023,121 A | 2/2000 | Dhuler et al. |
| 6,038,928 A | 3/2000 | Maluf et al. |
| 6,041,650 A | 3/2000 | Swindler et al. |
| 6,096,149 A | 8/2000 | Hetrick et al. |
| 6,105,737 A | 8/2000 | Weigert et al. |
| 6,114,794 A | 9/2000 | Dhuler et al. |
| 6,116,863 A | 9/2000 | Ahn et al. |
| 6,123,316 A | 9/2000 | Biegelsen et al. |
| 6,124,663 A | 9/2000 | Haake et al. |
| 6,171,972 B1 | 1/2001 | Mehregany et al. |
| 6,182,742 B1 | 2/2001 | Takahashi et al. |
| 6,224,445 B1 | 5/2001 | Neukermans et al. |
| 6,255,757 B1 | 7/2001 | Dhuler et al. |
| 6,279,606 B1 | 8/2001 | Hunnicutt et al. |
| 6,283,441 B1 | 9/2001 | Tian |
| 6,318,101 B1 | 11/2001 | Pham et al. |
| 6,321,549 B1 | 11/2001 | Reason et al. |
| 6,386,507 B2 | 5/2002 | Dhuler et al. |
| 6,390,782 B1 | 5/2002 | Booth et al. |
| 6,408,876 B1 | 6/2002 | Nishimura et al. |
| 6,430,951 B1 | 8/2002 | Iritani et al. |
| 6,494,804 B1 | 12/2002 | Hunnicutt et al. |
| 6,505,811 B1 | 1/2003 | Barron et al. |
| 6,520,197 B2 | 2/2003 | Deshmukh et al. |
| 6,523,560 B1 | 2/2003 | Williams et al. |
| 6,533,366 B1 | 3/2003 | Barron et al. |
| 6,540,203 B1 | 4/2003 | Hunnicutt |
| 6,581,640 B1 | 6/2003 | Barron |
| 6,637,722 B2 | 10/2003 | Hunnicutt |
| 6,662,581 B2 | 12/2003 | Hirota et al. |
| 6,694,998 B1 | 2/2004 | Hunnicutt |
| 6,724,718 B1 | 4/2004 | Shinohara et al. |

(56) References Cited

U.S. PATENT DOCUMENTS

| | | | |
|---|---|---|---|
| 6,755,761 | B2 | 6/2004 | Hunnicutt et al. |
| 6,761,420 | B2 | 7/2004 | Maluf et al. |
| 6,845,962 | B1 | 1/2005 | Barron et al. |
| 6,872,902 | B2 | 3/2005 | Cohn et al. |
| 6,902,988 | B2 | 6/2005 | Barge et al. |
| 6,958,255 | B2 | 10/2005 | Khuri-Yakub et al. |
| 6,966,329 | B2 | 11/2005 | Liberfarb |
| 7,011,378 | B2 | 3/2006 | Maluf et al. |
| 7,063,100 | B2 | 6/2006 | Liberfarb |
| 7,210,502 | B2 | 5/2007 | Fuller et al. |
| 7,234,313 | B2 | 6/2007 | Bell et al. |
| 7,372,074 | B2 | 5/2008 | Milne et al. |
| 7,449,413 | B1 | 11/2008 | Achuthan et al. |
| 7,528,689 | B2 | 5/2009 | Lee et al. |
| 7,987,679 | B2 * | 8/2011 | Tanaka .................. F25B 13/00 62/125 |
| 8,113,448 | B2 | 2/2012 | Keating |
| 8,113,482 | B2 | 2/2012 | Hunnicutt |
| 8,156,962 | B2 | 4/2012 | Luckevich |
| 8,827,546 | B2 | 9/2014 | Vonsild et al. |
| 2002/0014106 | A1 | 2/2002 | Srinivasan et al. |
| 2002/0029814 | A1 | 3/2002 | Unger et al. |
| 2002/0096421 | A1 | 7/2002 | Cohn et al. |
| 2002/0121100 | A1 | 9/2002 | Yabuki et al. |
| 2002/0174891 | A1 | 11/2002 | Maluf et al. |
| 2003/0061889 | A1 | 4/2003 | Tadigadapa et al. |
| 2003/0098612 | A1 | 5/2003 | Maluf et al. |
| 2003/0159811 | A1 | 8/2003 | Nurmi |
| 2003/0206832 | A1 | 11/2003 | Thiebaud et al. |
| 2004/0079101 | A1 | 4/2004 | Beitelmal et al. |
| 2004/0115905 | A1 | 6/2004 | Barge et al. |
| 2005/0121090 | A1 | 6/2005 | Hunnicutt |
| 2005/0200001 | A1 | 9/2005 | Joshi et al. |
| 2005/0205136 | A1 | 9/2005 | Freeman |
| 2006/0017125 | A1 | 1/2006 | Lee et al. |
| 2006/0067649 | A1 | 3/2006 | Tung et al. |
| 2006/0145885 | A1 | 7/2006 | Goulis et al. |
| 2006/0213263 | A1 | 9/2006 | Kawanishi et al. |
| 2006/0218953 | A1 | 10/2006 | Hirota |
| 2007/0062207 | A1 | 3/2007 | Aiyama et al. |
| 2007/0204635 | A1 * | 9/2007 | Tanaka .................. F25B 13/00 62/129 |
| 2007/0251586 | A1 | 11/2007 | Fuller et al. |
| 2007/0289941 | A1 | 12/2007 | Davies |
| 2008/0028779 | A1 | 2/2008 | Song |
| 2008/0042084 | A1 | 2/2008 | Fuller |
| 2008/0072977 | A1 | 3/2008 | George et al. |
| 2008/0229770 | A1 | 9/2008 | Liu |
| 2008/0271788 | A1 | 11/2008 | Matsuzaki et al. |
| 2009/0064693 | A1 | 3/2009 | Matsiev et al. |
| 2009/0123300 | A1 | 5/2009 | Uibel |
| 2009/0186466 | A1 | 7/2009 | Brewer |
| 2010/0019177 | A1 | 1/2010 | Luckevich |
| 2010/0038576 | A1 | 2/2010 | Hunnicutt |
| 2010/0204840 | A1 | 8/2010 | Sun et al. |
| 2010/0225708 | A1 | 9/2010 | Peng et al. |
| 2011/0056240 | A1 | 3/2011 | Malik et al. |
| 2011/0209485 | A1 | 9/2011 | Lifson et al. |
| 2011/0222576 | A1 * | 9/2011 | Vonsild ................. F25B 41/062 374/1 |
| 2012/0000540 | A1 * | 1/2012 | Harslund ............. G01K 15/005 137/1 |
| 2012/0000550 | A1 | 1/2012 | Hunnicutt et al. |
| 2012/0210713 | A1 | 8/2012 | Ernst et al. |
| 2013/0174591 | A1 | 7/2013 | Das et al. |

FOREIGN PATENT DOCUMENTS

| | | |
|---|---|---|
| CN | 102292684 A | 12/2011 |
| DE | 2215526 | 10/1973 |
| DE | 2930779 | 2/1980 |
| DE | 3401404 | 7/1985 |
| DE | 4101575 | 7/1992 |
| DE | 4417251 | 11/1995 |
| DE | 4422942 | 1/1996 |
| EP | 250948 | 1/1988 |
| EP | 261972 | 3/1988 |
| EP | 1024285 | 8/2000 |
| GB | 2238267 | 5/1991 |
| JP | Sho 39-990 | 2/1964 |
| JP | 04-000003 | 1/1992 |
| JP | H04297761 A | 10/1992 |
| JP | 06-117414 | 4/1994 |
| JP | 2000111213 A | 4/2000 |
| JP | 2001184125 | 7/2001 |
| JP | 2003-049933 | 2/2003 |
| JP | Sho 63-148062 | 7/2003 |
| JP | 2006-080194 | 3/2006 |
| WO | 99/16096 A1 | 4/1999 |
| WO | 99/24783 A1 | 5/1999 |
| WO | 00/14415 A2 | 3/2000 |
| WO | 00/14415 A3 | 7/2000 |
| WO | 2005/084211 A2 | 9/2005 |
| WO | 2005/084211 A3 | 1/2006 |
| WO | 2006/076386 A1 | 7/2006 |
| WO | 2008/076388 A1 | 6/2008 |
| WO | 2008/076388 B1 | 8/2008 |
| WO | 2008/121365 A1 | 10/2008 |
| WO | 2008/121369 A1 | 10/2008 |
| WO | 2010/019329 A2 | 2/2010 |
| WO | 2010/019329 A3 | 2/2010 |
| WO | 2010/019665 A2 | 2/2010 |
| WO | 2010/019665 A3 | 2/2010 |
| WO | 2010/065804 A2 | 6/2010 |
| WO | 2010/065804 A3 | 6/2010 |
| WO | 2011/022267 A2 | 2/2011 |
| WO | 2011/022267 A3 | 2/2011 |
| WO | 2011/094300 A2 | 8/2011 |
| WO | 2011/094300 A3 | 8/2011 |
| WO | 2011/094302 A2 | 8/2011 |
| WO | 2011/094302 A3 | 8/2011 |

OTHER PUBLICATIONS

Chinese First Office Action, Application No. 201310081837.9, dated Aug. 18, 2016.

Ayon et al., "Etching Characteristics and Profile Control in a Time Multiplexed ICP Etcher," Proc. of Solid State Sensor and Actuator Workshop Technical Digest, Hilton Head SC, (Jun. 1998) 41-44.

Bachmann, Stephan, "Electronic Expansion Valves: Fitters Notes (Part 8)", Danfoss Fitters Notes, Jul. 2008.

Bartha et al., "Low Temperature Etching of Si in High Density Plasma Using SF6/02," Microelectronic Engineering, and Actuator Workshop Technical Digest, Hilton Head SC, (Jun. 1998) 41-44.

Booth, Steve and Kaina, Rachid, Fluid Handling—Big Gains from Tiny Valve, Appliance Design (Apr. 2008), pp. 46-48.

Changenet et al., "Study on predictive functional control of an expansion valve for controlling the evaporator superheat", Proc. IMechE vol. 222 Part I, May 28, 2008, pp. 571-582.

Controls Overview for Microstaq Silicon Expansion Valve (SEV), Rev. 1, Dec. 2008 [online], [retrieved May 17, 2010]. Retrieved from the Internet <URL: http://www.microstaq.com/pdf/SEV_controls.pdf>.

Copeland, Michael V., Electronic valves promise big energy savings, Fortune, Sep. 9, 2008 [online], [retrieved Sep. 9, 2008]. Retrieved from the internet <URL: http://techland.blogs.fortune.cnn.com/2008/09/09/electronic-valves-promise-big-energy-savings>.

Fung et al., "Deep Etching of Silicon Using Plasma" Proc. of the Workshop on Micromachining and Micropackaging of Transducers, (Nov. 7-8, 1984) pp. 159-164.

Gui, C. et al, "Selective Wafer Bonding by Surface Roughness Control", Journal of the Electrochemical Society, 148 (4) G225-G228 (2001).

Gui, C. et al., "Fusion bonding of rough surfaces with polishing technique for silicon micromachining", Microsystem Technologies (1997) 122-128.

Günther, Götz, "Entwicklung eines pneumatischen 3/2-Wege-Mikroventils", O + P Olhydraulik Und Pneumatik, Vereinigte (56) References Cited

OTHER PUBLICATIONS

Fachverlage, Mainz, DE, vol. 42, No. 6, Jun. 1, 1998, pp. 396-398, XP000831050, ISSN: 0341-2660.
Higginbotham, Stacey, Microstaq's Tiny Valves Mean Big Energy Savings [online], [retrieved Dec. 8, 2008]. Retrieved from the Internet <URL: http//earth2tech.com/2008/09/09/microstaqs-tiny-valves-mean-big-energy savings (posted Sep. 9, 2008)>.
J. Mark Noworolski, et al.,"Process for in-plane and out-of-plane single-crystal-silicon thermal microactuators", Sensors and Actuators A 55 (1996); pp. 65-69.
Jonsmann et al., "Compliant Electra-thermal Microactuators", IEEE Technical Digest, Twelfth IEEE International Conference on Micro Electro Mechanical Systems Jan. 17-21, 1999, Orlando, Florida, pp. 588-593, IEEE Catalog No. 99CH36291C.
K.R. Williams et al., "A Silicon Microvalve for the Proportional Control of Fluids", Transducers '99, Proc. 10th International Conference on Solid State Sensors and Actuators, held Jun. 7-10, 1999, Sendai, Japan, pp. 18-21.
Keefe, Bob, Texas firm says value-replacing chip can drastically cut energy use, Atlanta Metro News, Sep. 10, 2008 [online], [retrieved Sep. 10, 2008]. Retrieved from the Internet <URL: http://www.ajc.com/search/content/shared/money/stories/2008/09/microstaq10_cox-F9782.html>.
Klaassen et al., "Silicon Fusion Bonding and Deep Reactive Ion Etching; A New Technology for Microstructures," Proc., Transducers 95 Stockholm Sweden, (1995) 556-559.
Linder et al., "Deep Dry Etching Techniques as a New IC Compatible Tool for Silicon Micromachining," Proc, Transducers, vol. 91, (Jun. 1991) pp. 524-527.
Luckevich, Mark, MEMS microvlaves: the new valve world, Valve World (May 2007), pp. 79-83.
Madou, Marc, "Fundamentals of Microfabrication", Boca Raton: CRC Press, 1997, 405-406.
MEMS, Microfluidics and Microsystems Executive Review [online], Posted Apr. 16, 2009. [retrieved May 17, 2010]. Retrieved from the Internet <URL: http:www.memsinvestorjournal.com/2009/04/mems-applications-for-flow-control-.html>.
Microstaq Announces High Volume Production of MEMS-Based Silicon Expansion Valve [onlne], [retrieved Jan. 27, 2010]. Retrieved from the Internet <URL: http://www.earthtimes.org/articles/printpressstory.php?news+1138955 (posted Jan. 27, 2010)>.
Microstaq Product Description, Proportional Piloted Silicon Control Valve (CPS-4) [online], Published 2008, [retrieved May 17, 2010]. Retrieved from the Internet <URL: http://www.microstaq.com/products/cps4.html>.
Microstaq Product Description, Proportional Direct Acting Silicon Control Valve (PDA-3) [online], Published 2008, [retrieved May 17, 2010]. Retrieved from the Internet <URL: http://www.microstaq.com/products/pda3.html>.
Microstaq Product Descriptions, SEV, CPS-4, and PDA-3 [online], Published 2009, [retrieved May 17, 2010]. Retrieved from the Internet <URL: http://www.microstaq.com/products/index.html>.
Microstaq Technology Page [online], Published 2008, [retrieved May 17, 2010]. Retrieved from the Internet <URL: http://www.microstaq.com/technology/index.html>.
Petersen et al. "Surfaced Micromachined Structures Fabricated with Silicon Fusion Bonding" Proc., Transducers 91, (Jun. 1992) pp. 397-399.
Press Release, Freescale and Microstaq Join Forces on Smart Superheat Control System for HVAC and Refrigeration Efficiency (posted Jan. 22, 2008) [online], [retrieved May 17, 2010]. Retrieved from the Internet <URL: http://www.microstaq.com/pressReleases/prDetail_04.html>.
Press Release, Microstaq Unveils Revolutionary Silicon Expansion Valve at Demo 2008 [online], [retrieved May 17, 2010]. Retrieved from the Internet <URL: http://www.microstaq.com/pressReleases/prDetail_05.html (posted Sep. 8, 2008)>.
Press Release, Microstaq Mastering Electronic Controls for Fluid-Control Industry (posted May 5, 2005) [online[, [retrieved May 17, 2010]. Retrieved from the Internet <URL: http://www.microstaq.com/pressReleases/prDetail_02.html>.
Press Release, Nanotechnology Partnerships, Connections Spur Innovation for Fluid Control Industries (posted Jun. 9, 2005) [online], [retrieved May 17, 2010]. Retrieved from the Internet <URL: http://www.microstaq.com/pressReleases/prDetail_03.html>.
Product Review, greentechZONE Products for the week of May 18, 2009 [online], [retrieved May 17, 2010]. Retrieved from the Internet <URL: http://www.en-genius.net/site/zones/greentechZONE/product_reviews/grnp_051809>.
SEV Installation Instructions [online], [retrieved May 17, 2010]. Retrieved from the Internet <URL: http://www.microstaq.com/pdf/SEV_Instruction_sheet.pdf>.
Silicon Expansion Valve Information Sheet [online], [retrieved May 17, 2010]. Retrieved from the Internet <URL: http://www.microstaq.com/pdf/SEV_Infosheet_2_0.pdf>.
Silicon Expansion Valve (SEV)—for Heating, Cooling, and Refrigeration Applications [online], [retrieved May 17, 2010]. Retrieved from the Internet <URL: http://www.microstaq.com/pdf/SEV_Quicksheet.pdf>.
Silicon Expansion Valve Data Sheet [online], [retrieved May 17, 2010]. Retrieved from the Internet <URL: http://www.microstaq.com/pdf/SEV_Datasheet_1_8.pdf>.
SMIC Announces Successful Qualification of a MEMS Chip for Microstaq (posted Oct. 26, 2009) [online], [retrieved May 17, 2010]. Retrieved from the Internet <URL: http://www.prnewswire.com/news-releases/smic-announces-successful-qualification-of-a-mems-chip-for-microstaq-65968252.html (posted Oct. 26, 2009)>.
SMIC quals Microstaq MEMS chip for fluid control (posted Oct. 26, 2009) [online], [retrieved May 17, 2010]. Retrieved from the Internet <URL: http://www.electroiq.com/ElectroiQ/en-us/index/display/Nanotech_Article_Tools_Template.articles.small-times.nanotechmems.mems.microfluidics.2009.10.smic-quals_microstaq.html>.
Tiny Silicon Chip Developed by Microstaq Will Revolutionize Car Technology (posted May 19, 2005) [online], [retrieved May 19, 2005]. Retrieved from the Internet <URL: http://www.nsti.org/press/PRshow.html?id=160>.
Turpin, Joanna R., Soft Economy, Energy Prices Spur Interest in Technologies [online], Published Dec. 8, 2008. [retrieved May 18, 2010]. Retrieved from the Internet <URL: http://www.achrnews.com/copyright/BNP_GUID_9-5-2006_A_10000000000000483182>.
Uibel, Jeff, The Miniaturization of Flow Control (Article prepared for the 9th International Symposium on Fluid Control Measurement and Visualization (FLUCOME 2007)), Journal of Visualization (vol. 11, No. 1, 2008), IOS Press.
Yunkin et al., "Highly Anisotropic Selective Reactive Ion Etching of Deep Trenches in Silicon," Microelectronic Engineering, Elsevier Science B.V., vol. 23, (1994) pp. 373-376.
Zhixiong Liu et al., "Micromechanism fabrication using silicon fusion bonding", Robotics and Computer Integrated Manufacturing 17 (2001) 131-137.
Non Final Office Action, U.S. Appl. No. 14/854,449, dated Mar. 10, 2016.

* cited by examiner

METHOD OF SENSING SUPERHEAT

CROSS-REFERENCE TO RELATED APPLICATIONS

This application is a divisional patent application of U.S. patent application Ser. No. 13/563,017 filed Jul. 31, 2012, which claims the benefit of U.S. Provisional Application No. 61/611,747 filed Mar. 16, 2012. The disclosure of both applications are incorporated herein by reference.

BACKGROUND OF THE INVENTION

Various embodiments of a fluid sensor are described herein. In particular, the embodiments described herein relate to an improved superheat sensor.

There are many fluid system applications that require knowledge of a fluid's superheat in order to optimize the state of the fluid system. These systems include, but are not limited to, HVAC systems. Fluids that may be used within these systems include, but are not limited to, refrigerants.

As used herein, the term superheat is defined as the condition where the fluid, regardless of the system type, has excess energy relative to the fluid's boiling point. This excess energy may be measured as the number of degrees of temperature above the fluid's boiling point, or superheat.

Methods of measuring superheat are known. For example, U.S. Pat. No. 5,070,706 discloses a superheat sensor having a single coupling to a fluid channel carrying fluid through which superheat is being measured.

U.S. Pat. No. 5,820,262 discloses a refrigerant sensor for calculating a superheat value for refrigerant material. The sensor has an internal pressure sensor and an internal temperature sensor.

U.S. Patent Publication No. 2011/0192224 discloses a superheat sensor having a flexible wall that defines an interface between an inner cavity having a charge fluid therein and the flow channel in thermal contact with the fluid flowing therein. The flexible wall is adapted to conduct heat between the flow channel and the inner cavity.

U.S. Patent Publication No. 2011/0222576 discloses a method for calibrating a superheat sensor.

Typical superheat sensors do not provide automatic fluid-type detection, high sensitivity, and resolution under a wide range of pressures, store superheat and related parametric history, generate alarms, and provide a variety of industry standard reporting options.

Accordingly, there remains a need in the art for an improved sensor and method of identifying and measuring superheat in fluids, especially refrigerants in HVAC systems.

SUMMARY OF THE INVENTION

The present application describes various embodiments of a superheat sensor. One embodiment of the superheat sensor includes a housing, a pressure sensor mounted within the housing, a fluid passageway connecting the pressure sensor to a source of superheat fluid, and a processor.

In a second embodiment, a method of sensing superheat includes connecting a fluid inlet member of a superheat sensor to one of a plurality of fluid systems and allowing fluid to flow from the fluid system to which the superheat sensor is connected to the superheat sensor. A temperature of the fluid in the fluid system is sensed with one of an internal temperature sensor mounted within a housing of the superheat sensor and an external temperature sensor mounted outside of the housing of the superheat sensor. A superheat of the fluid in the fluid system is then calculated.

In a third embodiment, a method of sensing superheat includes calibrating a superheat sensor and connecting a fluid inlet member of the superheat sensor to one of a plurality of fluid systems. Fluid is allowed to flow from the fluid system to which the superheat sensor is connected to the superheat sensor. A temperature of the fluid in the fluid system is sensed, and a fluid type of the fluid in the fluid system is detected. A superheat of the fluid in the fluid system is then calculated and error conditions are determined. Superheat and related parametric and alarm data are stored. The superheat sensor is disconnected and subsequently connected to another of the plurality of fluid systems without re-calibrating the superheat sensor.

Other advantages of the superheat sensor will become apparent to those skilled in the art from the following detailed description, when read in view of the accompanying drawings.

DETAILED DESCRIPTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from errors found in their respective measurements.

As used in the description of the invention and the appended claims, the phrase "universal superheat sensor" is defined as a superheat sensor which contains all the necessary sensors, electronics, and intelligence to automatically detect multiple fluid types, such as refrigerants, without re-calibration, and report the superheat of the multiple common fluid types used in residential, industrial, and scientific applications.

The superheat sensor according to the invention is a single, self-contained, stand-alone device which contains all the necessary sensors, electronics, and intelligence to automatically detect the fluid type, such as refrigerant, and report the superheat of multiple common fluid types used in residential, industrial, and scientific applications. The superheat sensor according to the invention communicates this information in a cost effective way using industry standard reports. It stores this information in a local memory device for subsequent retrieval of historical data. Additional data storage may be provided, such as through removable memory cards, and via an off-board computer, such as a laptop computer. The superheat sensor according to the invention may also be configured to provide the user various alarms for conditions such as low pressure (fluid leakage), low and/or high superheat (indicators of system flooding and out-of-range system efficiency), excessive pressure (system overcharge or imminent hardware failure), temperature out of range, and like conditions.

Figure 1:
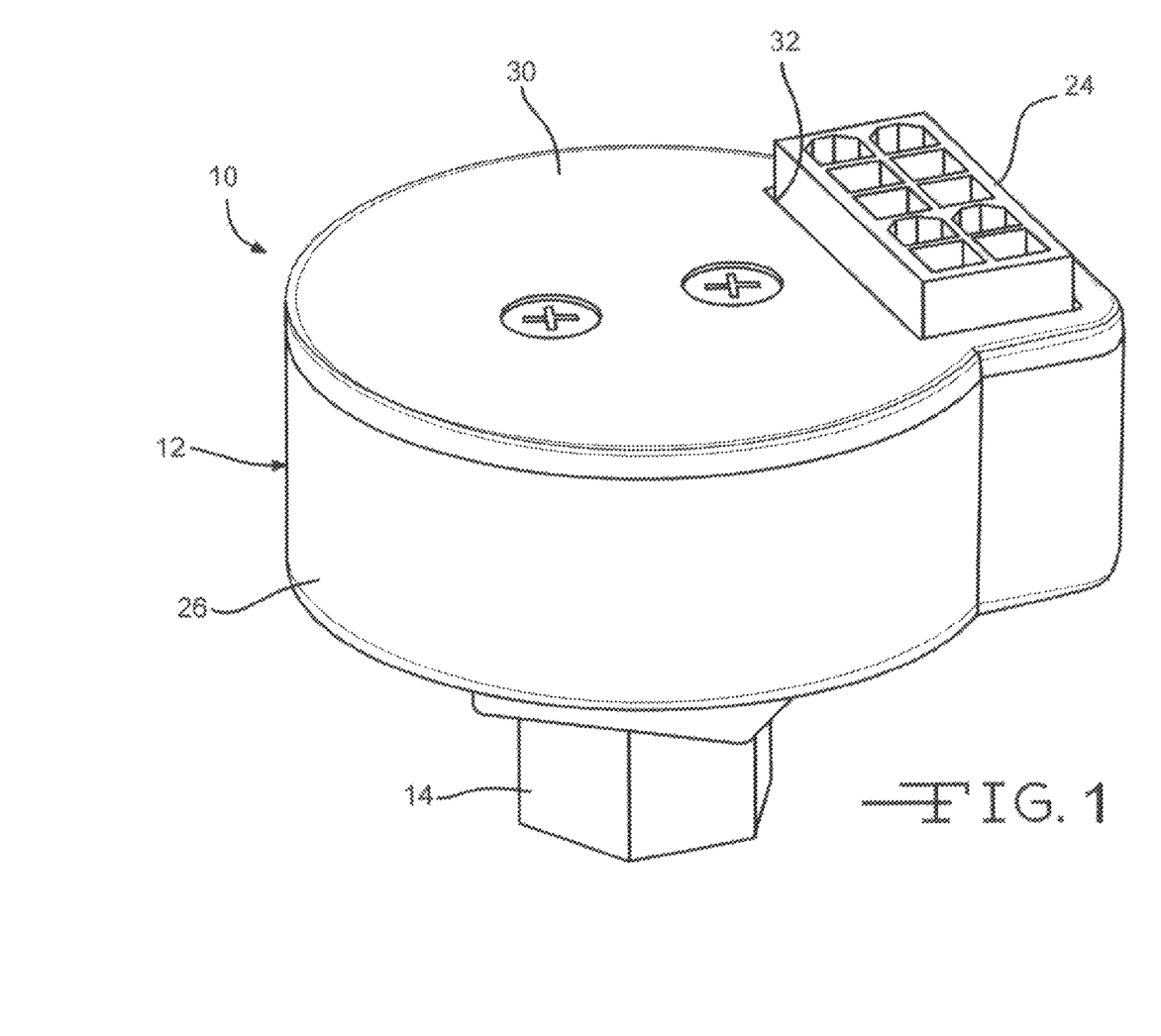
FIG. 1 is a perspective view of a first embodiment of the universal superheat sensor according to the invention.
Figure 2:
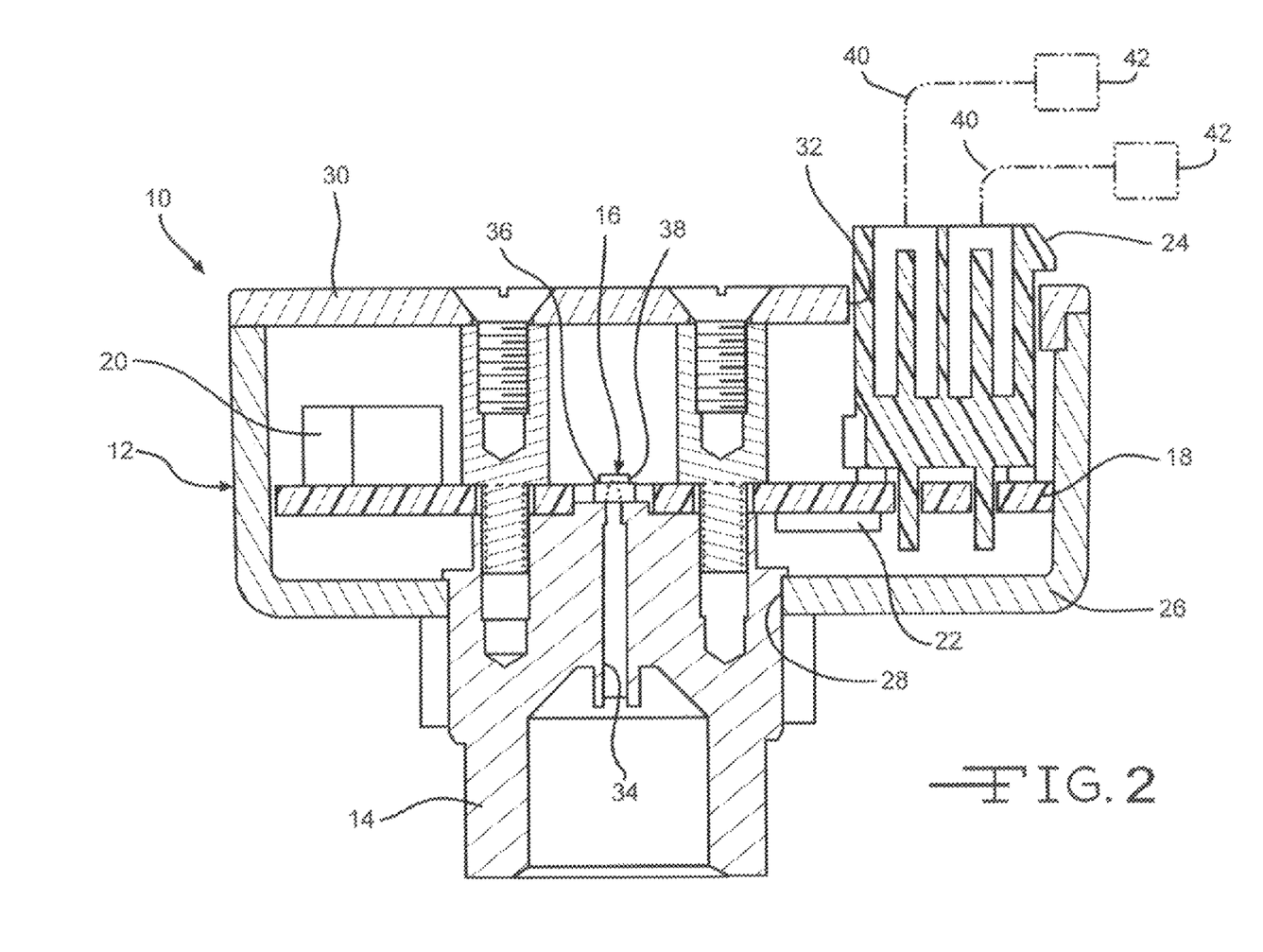
FIG. 2 is a cross sectional view of the universal superheat sensor illustrated in FIG. 1.

Referring now to FIGS. 1 and 2, a first embodiment of the universal superheat sensor 10 includes a housing 12, a fluid inlet member 14, an integrated pressure and temperature sensor 16, a printed circuit board (PCB) 18, a superheat processor 20, a data-reporting or communication module 22, and an Input/Output (IO) module 24. It will be understood that in lieu of the PCB 18, alternative substrates may be used for mounting electronic components. For example, electronic components, including but not limited to those disclosed below, may be mounted on a substrate formed from a polymer, ceramic, metal, or other desired material.

The housing 12 is the enclosure for all or a portion of the components of the universal superheat sensor 10. The illustrated housing 12 is provides a hermetic or airtight sealed space within which the measurement of the fluid may occur. The illustrated housing 12 includes a body 26 having an opening 28 in which the fluid inlet member 14 is mounted, and a cover 30 having an opening 32 in which the IO module 24 is mounted. If desired, a seal (not shown) may be disposed between the body 26 and the cover 30.

The body 26 and the cover 30 of the housing 12 may have any other desired size and shape, and may be formed from any desired material, such as plastic, metal, or ceramic. Alternatively, the fluid inlet member 14 may be formed from any other desired material.

In the embodiment illustrated in FIG. 2, the fluid inlet member 14 is a brass core or fitting having a centrally formed fluid passageway 34. The fluid inlet member 14 connects the integrated pressure and temperature sensor 16 to the source of superheat fluid (not shown). The fluid inlet member 14 may be any type of fitting, such as a standard ¼ inch port. Any other desired type of fluid inlet member may also be used. Additionally, external adapters (not shown) may be attached to the fluid inlet member 14 to connect it to a variety of fluid fittings (not shown) of fluid systems, such as HVAC systems.

As shown in FIG. 2, the illustrated integrated pressure and temperature sensor 16 is mounted to the PCB 18 within the housing 12, and includes a wide-range pressure sensor portion 36 that converts fluid pressure to an electrical signal. The generated electrical signal may be subsequently used by the superheat processor 20. As used in the description of the invention and the appended claims, the phrase "wide-range pressure sensor" is defined as a pressure sensor that it will support common ranges of system pressures that occur in known refrigerant systems while maintaining accuracy. The pressure sensor portion 36 may be any type of pressure sensor; including silicon, piezo-ceramic, capacitive, and integrated hall-effect transducers, and any other device that produces an electrical analogue of pressure. In the illustrated embodiment, the pressure sensor portion 36 of the integrated pressure and temperature sensor 16 is a silicon transducer. As shown in FIG. 2, the integrated pressure and temperature sensor 16 is exposed directly to the pressurized superheat fluid via the fluid inlet member 14 for fast and accurate measurement.

The illustrated integrated pressure and temperature sensor 16 includes a temperature sensor portion 38 that converts temperature to an electrical signal. The generated electrical signal may be subsequently used by the superheat processor 20. The illustrated temperature sensor portion 38 is provided to measure the internal liquid refrigerant temperature and is structured and configured to support a wide range of fluid system temperatures, such as temperatures within the range of from about −50 degrees C. to about +125 degrees C., while maintaining an acceptable accuracy for a specific application. In some applications, an acceptable accuracy may be +/−0.5 degrees C. In other applications, an acceptable accuracy may be a range smaller or larger than +/−0.5 degrees C. Alternatively, the temperature sensor portion 38 may support fluid system temperatures within the range of from about −25 degrees C. to about +150 degrees C. The temperature sensor portion 38 may be any type of temperature sensor, including a thermistor, a thermocouple, a resistive element etched onto a substrate, a diode, or any other device that produces an electrical analogue of temperature. Advantageously, the illustrated integrated pressure and temperature sensor 16 is relatively small and physically close to the fluid to maximize both response time and measurement accuracy. It will be understood that the temperature sensor and the pressure sensor may be separate sensors as described below.

The illustrated superheat processor 20 is mounted to the PCB 18 and is a high-resolution, high accuracy device that processes the input signals from the pressure and temperature sensor portions 36 and 38, respectively, of the integrated pressure and temperature sensor 16, detects the fluid type, calculates the superheat of the fluid, and provides an output that identifies the level of the calculated superheat. The superheat processor 20 may also be configured to provide other data, such as fluid temperature, fluid pressure, fluid type, historical data maintained in an onboard memory (such as alarm and on-off history), and other desired information. The superheat processor 20 may be configured as a high-resolution processor that is able to detect and process, with a single pressure sensor and a single temperature sensor, or with the illustrated integrated pressure and temperature sensor 16, the wide-range of system pressures and temperatures that may be encountered in the fluids of the fluid systems with which the universal superheat sensor 10 will be used, for example refrigerants of HVAC systems. Advantageously, the superheat processor 20 maintains a high level of accuracy through one-time calibration over the operating range of pressure and temperature input. Non-limiting examples of suitable superheat processors include microcontrollers, Field Programmable Arrays (FPGA), and Application Specific Integrated Circuits (ASIC) with embedded and/or off-board memory and peripherals.

The illustrated communication module 22 is mounted to the PCB 18 and is a configurable hardware module that provides industry-standard Modbus data over a hard-wired backbone, such as an RS485 hard-wired backbone, schematically illustrated at 40 in FIG. 2. If desired, the communication module 22 may provide Modbus data and other communication protocols over communications means, such as RS232, I2C, SPI, and 4-20 mA, Current Loop, USB 2.0, Bluetooth, an RF module, and wireless information to a cell-phone application. An internal antenna (not shown) may be provided to support the RF module. The illustrated communication module 22 is flexible enough to support other current and future communication protocols as they become available.

The illustrated IO module 24 is a physical hardware interface that accepts input power and reports data through the available hard-wired interfaces. Common target devices that may be connected to the universal superheat sensor 10 via the IO module 24 are schematically illustrated at 42 in FIG. 2, and include, but are not limited to: additional temperature sensors (such as the temperature sensor 44 illustrated in FIG. 3) industry standard controller modules, laptop and notebook computers, cell phones, and memory cards such as non-volatile memory cards.

Figure 3:
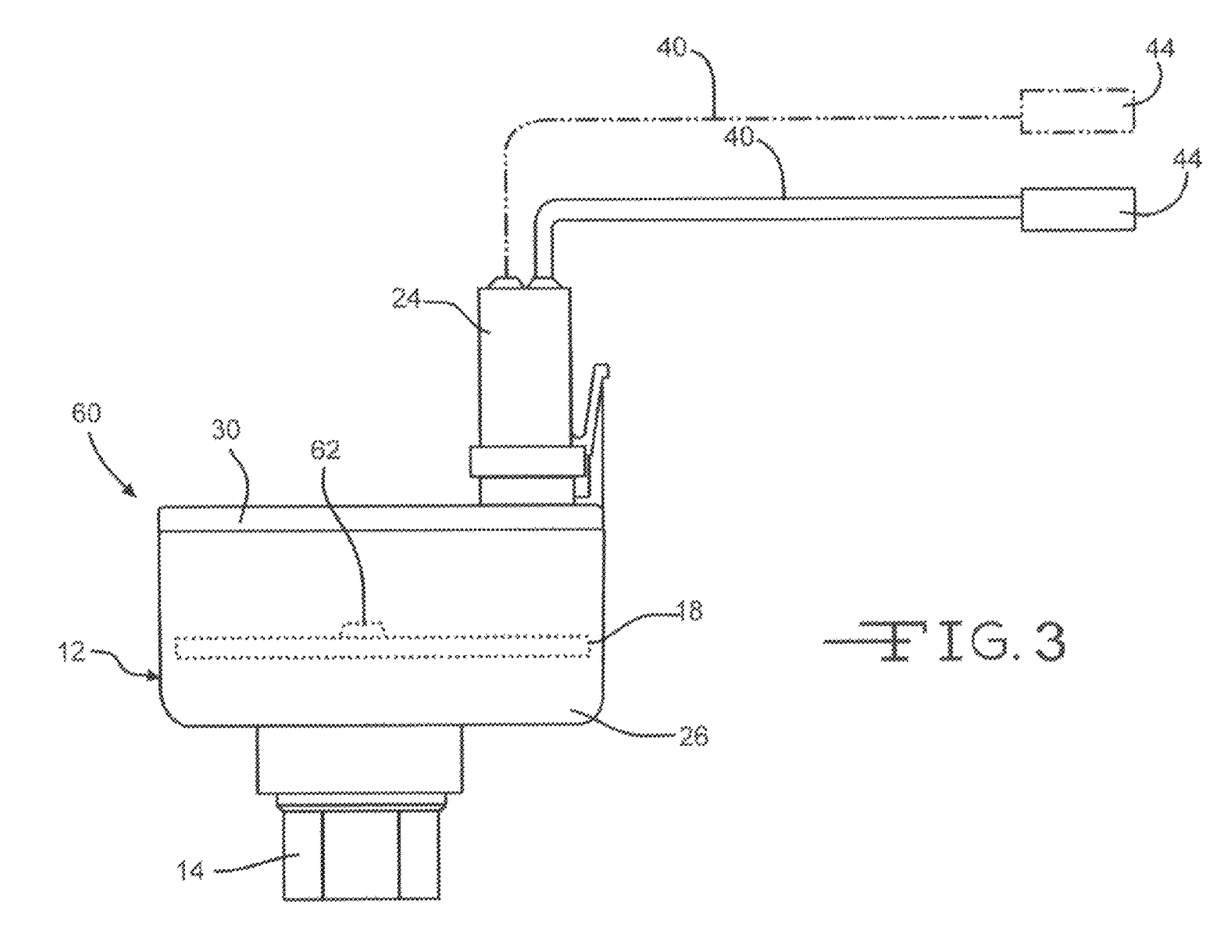
FIG. 3 side elevational view of a second embodiment of the universal superheat sensor.

As shown in FIG. 3, an external temperature sensor 44 may be connected to the IO module 24 via the backbone 40. Also, the external temperature sensor 44 may be positioned near various components of a refrigeration system, such as an evaporator outlet and a compressor to measure the evaporator core temperature, the discharge temperature, and the like. It will be understood that any desired number of external temperature sensors 44 may be connected to the IO module 24 to simultaneously measure the temperature internally and at multiple components or devices.

Advantageously, the superheat processor 20 may process the pressure and temperature inputs from the integrated pressure and temperature sensor 16 and the external temperature sensors 44, if provided. The superheat processor 20 is calibrated to detect and identify a plurality of fluid types. The superheat processor 20 further calculates the superheat of any of the plurality of fluid types with a high degree of resolution and accuracy. The superheat processor 20 may also determine error conditions and store superheat and related parametric and alarm data. The superheat processor 20 may then report the superheat of the fluid system to which the superheat sensor 10 is attached. The superheat processor 20 may also report additional data such as temperature, pressure, fluid type, on-time, alarms, operational history, and the like. Advantageously, the superheat processor 20 needs to be calibrated only one time, and may thereafter calculate superheat and perform any of the tasks described above for any of a plurality of fluid types.

Additionally, the embodiments of the universal superheat sensor 10, 60, 70, and 80 described herein allow real-time data to be presented to a user, such as a contractor.

Referring again to FIG. 3, a second embodiment of the universal superheat sensor is shown at 60. The illustrated universal superheat sensor 60 includes the housing 12, the fluid inlet member 14, the PCB 18, the superheat processor (not shown in FIG. 3), the communication module (not shown in FIG. 3), the IO module 24, an internal pressure sensor 62, and an external temperature sensor 44, as described above. As described above, any desired number of external temperature sensors 44 may be connected to the IO module 24 to simultaneously measure the temperature at multiple components or devices.

Figure 4:
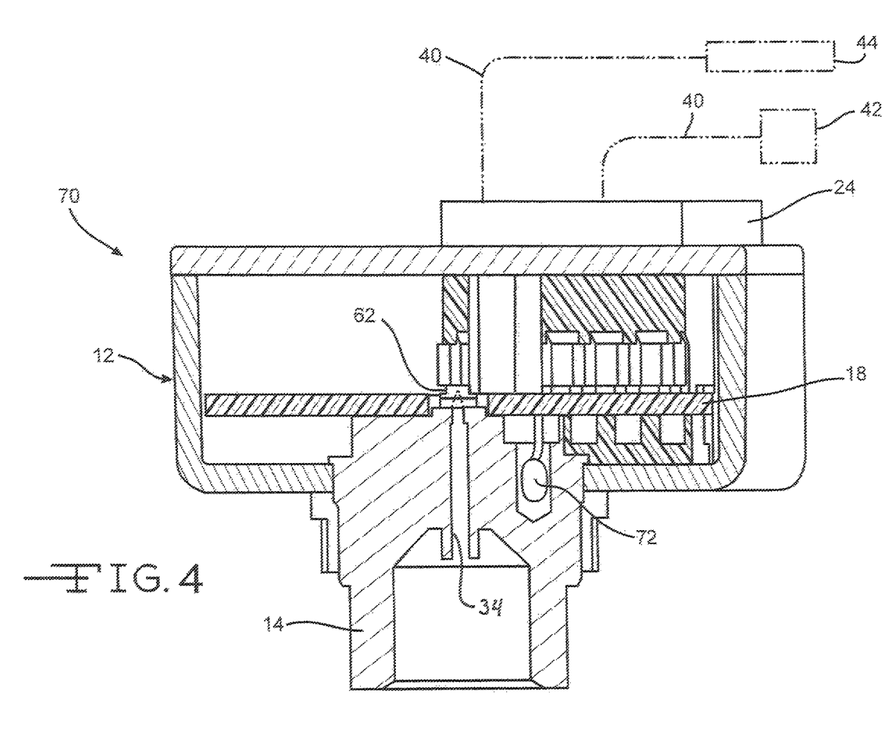
FIG. 4 is a cross sectional view of a third embodiment of the universal superheat sensor.

Referring now to FIG. 4, a third embodiment of the universal superheat sensor is shown at 70. The illustrated universal superheat sensor 70 includes the housing 12, the fluid inlet member 14, the PCB 18, the superheat processor (not shown in FIG. 4), the communication module (not shown in FIG. 4), the IO module 24, an internal pressure sensor 62, and an internal temperature sensor 72. As shown in FIG. 4, the internal temperature sensor 72 is mounted within the housing 12, but is not in contact with the superheat fluid. Rather, the internal temperature sensor 72 is adjacent to, but outside of the fluid passageway 34. It will be understood that the any desired number of external temperature sensors 44 may also be connected to the IO module 24 to simultaneously measure the temperature internally and at multiple components or devices. In addition to one or more external temperature sensors 44, if desired, the universal superheat sensor 80 may also include one or more of the target devices 42 that may be connected to the IO module 24 of the universal superheat sensor 80 via the backbone 40, as described above.

Figure 5:
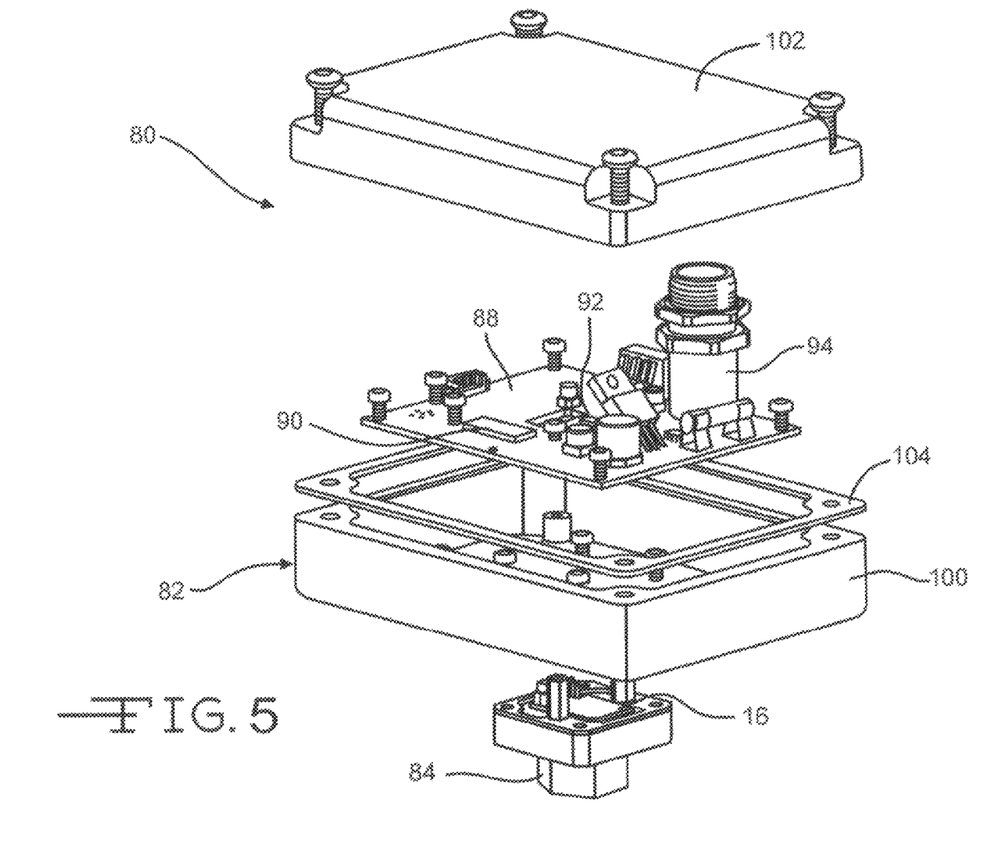
FIG. 5 is an exploded perspective view of a fourth embodiment of the universal superheat sensor.

Referring now to FIG. 5, a fourth embodiment of the universal superheat sensor is shown at 80. The illustrated universal superheat sensor 80 includes a housing 82, a fluid inlet member 84, the PCB 88, the superheat processor 90, the communication module 92, and the IO module 94. The universal superheat sensor 80 may include the integrated pressure and temperature sensor 16. Alternatively, the universal superheat sensor 80 may include an internal temperature sensor and an internal pressure sensor, neither of which are shown in FIG. 5, but both of which are described above. The illustrated housing 82 includes a body 100 having an opening (not shown) in which the fluid inlet member 84 is mounted, and a cover 102. A seal 104 may be disposed between the body 100 and the cover 102. If desired, the universal superheat sensor 70 may also include one or more external temperature sensors 44, as described above, and may further include one or more target devices 42 that may be connected to the IO module 24 of the universal superheat sensor 70 via the backbone 40, as described above.

The principle and mode of operation of the universal superheat sensor have been described in its preferred embodiments. However, it should be noted that the universal superheat sensor described herein may be practiced otherwise than as specifically illustrated and described without departing from its scope.

What is claimed is:
1. A method of sensing superheat comprising the steps of:
(a) connecting a fluid inlet member of a superheat sensor to one of a plurality of fluid systems;
(b) allowing fluid to flow from the fluid system to which the superheat sensor is connected to the superheat sensor;
(c) sensing a temperature of the fluid in the fluid system with an internal temperature sensor mounted completely within a housing of the superheat sensor such that the internal temperature sensor is not in contact with the superheat fluid within the super-heat sensor, and such that the internal temperature sensor is outside of a flow path of fluid from the one of the plurality of fluid systems to which the superheat sensor is connected;
(d) detecting a fluid type of the fluid in the fluid system;
(e) calculating a superheat of the fluid in the fluid system; and

(f) providing a user of the method of sensing superheat an alarm when one of a plurality of sensed conditions is present in the fluid system.

2. The method of sensing superheat according to claim 1 further comprising a step of sensing a pressure of the fluid in the fluid system with a pressure sensor mounted within a housing of the superheat sensor.

3. The method of sensing superheat according to claim 2 further comprising a step of calibrating the superheat sensor to detect and identify a plurality of fluid types.

4. The method of sensing superheat according to claim 3 further comprising a step of calculating the superheat of any of the plurality of fluid types.

5. The method of sensing superheat according to claim 2 wherein the step of sensing a temperature of the fluid in the fluid system and the step of sensing the pressure of the fluid in the fluid system is performed by an integrated pressure and temperature sensor mounted completely within the housing of the superheat sensor such that the integrated pressure and temperature sensor is not in contact with the superheat fluid within the super-heat sensor, and such that the integrated pressure and temperature sensor is outside of a flow path of fluid from the one of the plurality of fluid systems to which the superheat sensor is connected.

6. A method of sensing superheat comprising the steps of:
(a) calibrating a superheat sensor;
(b) connecting a fluid inlet member of the superheat sensor to one of a plurality of fluid systems;
(c) allowing fluid to flow from the fluid system to which the superheat sensor is connected to the superheat sensor;
(d) sensing a temperature of the fluid in the fluid system with an internal temperature sensor mounted completely within a housing of the superheat sensor such that the internal temperature sensor is not in contact with the superheat fluid within the super-heat sensor;
(e) detecting a fluid type of the fluid in the fluid system;
(f) calculating a superheat of the fluid in the fluid system;
(g) providing a user of the method of sensing superheat an alarm when one of a plurality of sensed conditions is present in the fluid system;
(h) storing superheat alarm data in a memory device;
(i) disconnecting the superheat sensor and subsequently connecting the superheat sensor to another of the plurality of fluid systems without re-calibrating the superheat sensor.

7. The method of sensing superheat according to claim 6 further comprising a step of reporting any of temperature data, pressure data, fluid type, on-time data, alarm data, and operational history data.

8. The method of sensing superheat according to claim 6 wherein the plurality of sensed conditions for which an alarm is provided is one of low pressure, low superheat, high superheat, excessive pressure, and temperature out of range.

9. The method of sensing superheat according to claim 6 further including storing in the memory device one of an alarm time, alarm duration, and an alarm cause of the alarm provided to the user.

10. The method of sensing superheat according to claim 6 further comprising a step of sensing temperature of a component of the fluid system to which the superheat sensor is attached with an external temperature sensor located outside a housing of the superheat sensor and electrically connected to a superheat processor of the superheat sensor, the external temperature sensor electronically connected to the component and configured to provide one of an internal temperature of the component, an external temperature of the component, and a temperature of fluid in the component.

* * * * *